Aug. 3, 1943.  G. H. DOWTY  2,326,020
AIRCRAFT LANDING GEAR
Filed Nov. 25, 1939    5 Sheets-Sheet 5
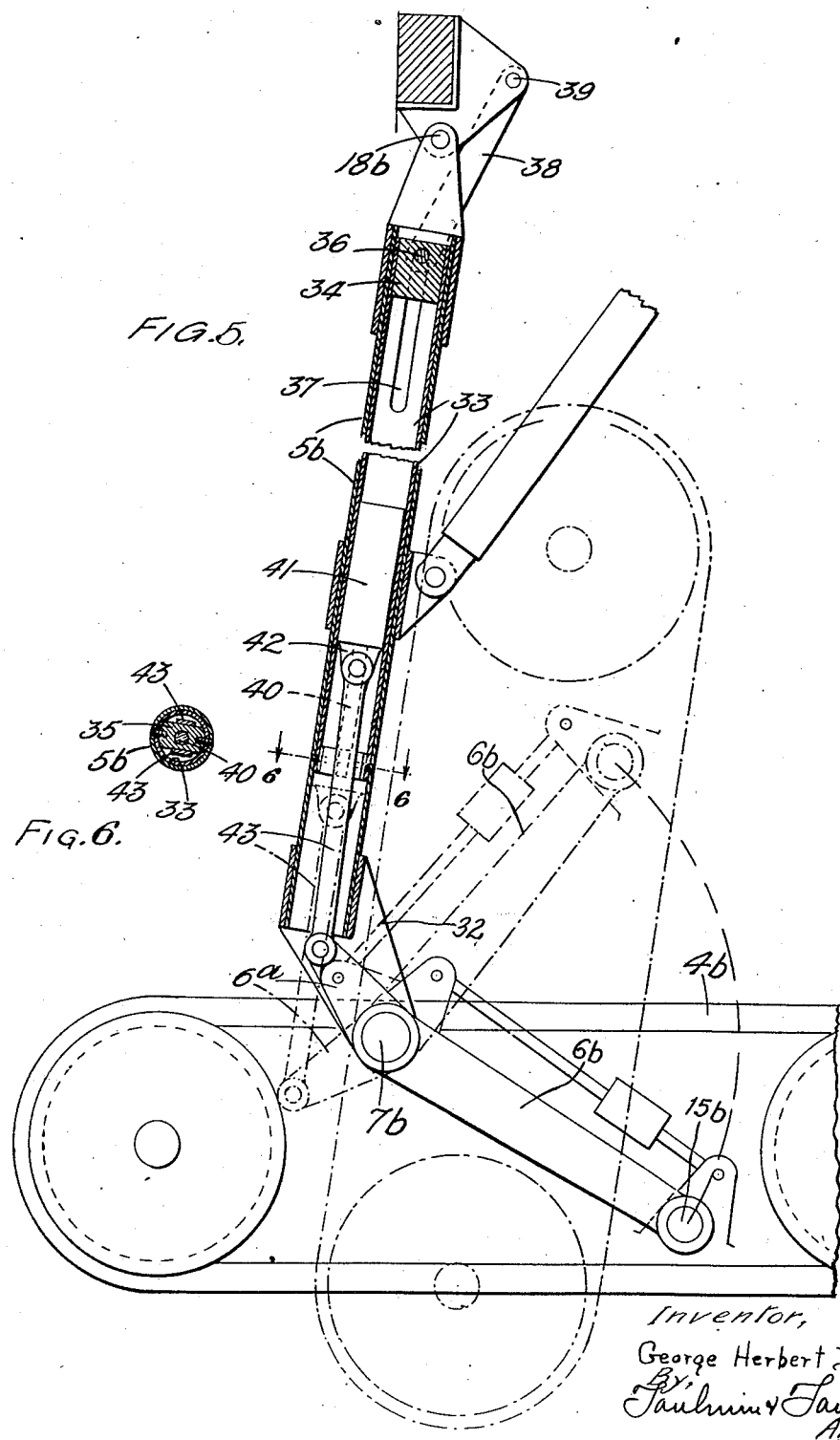

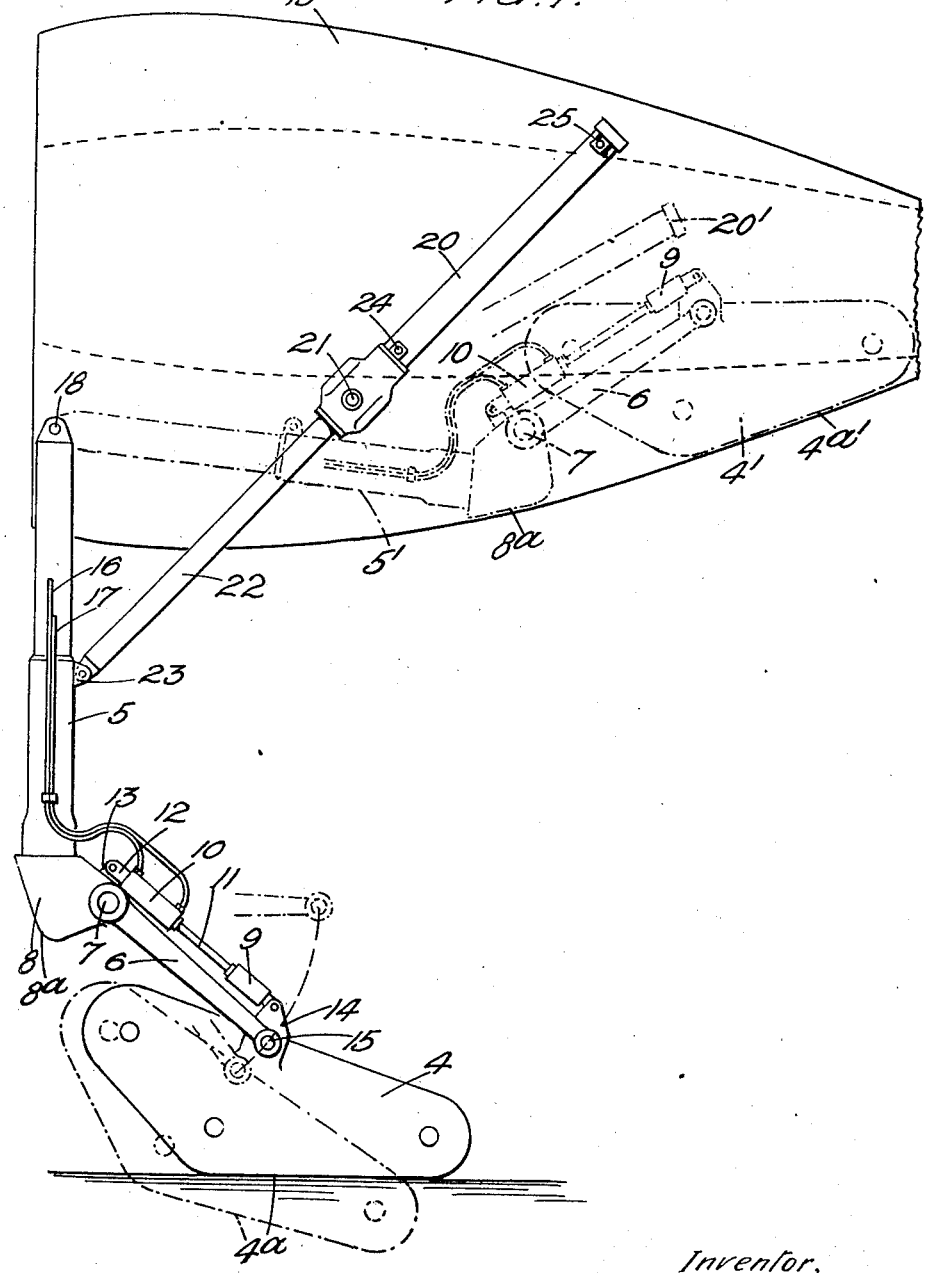

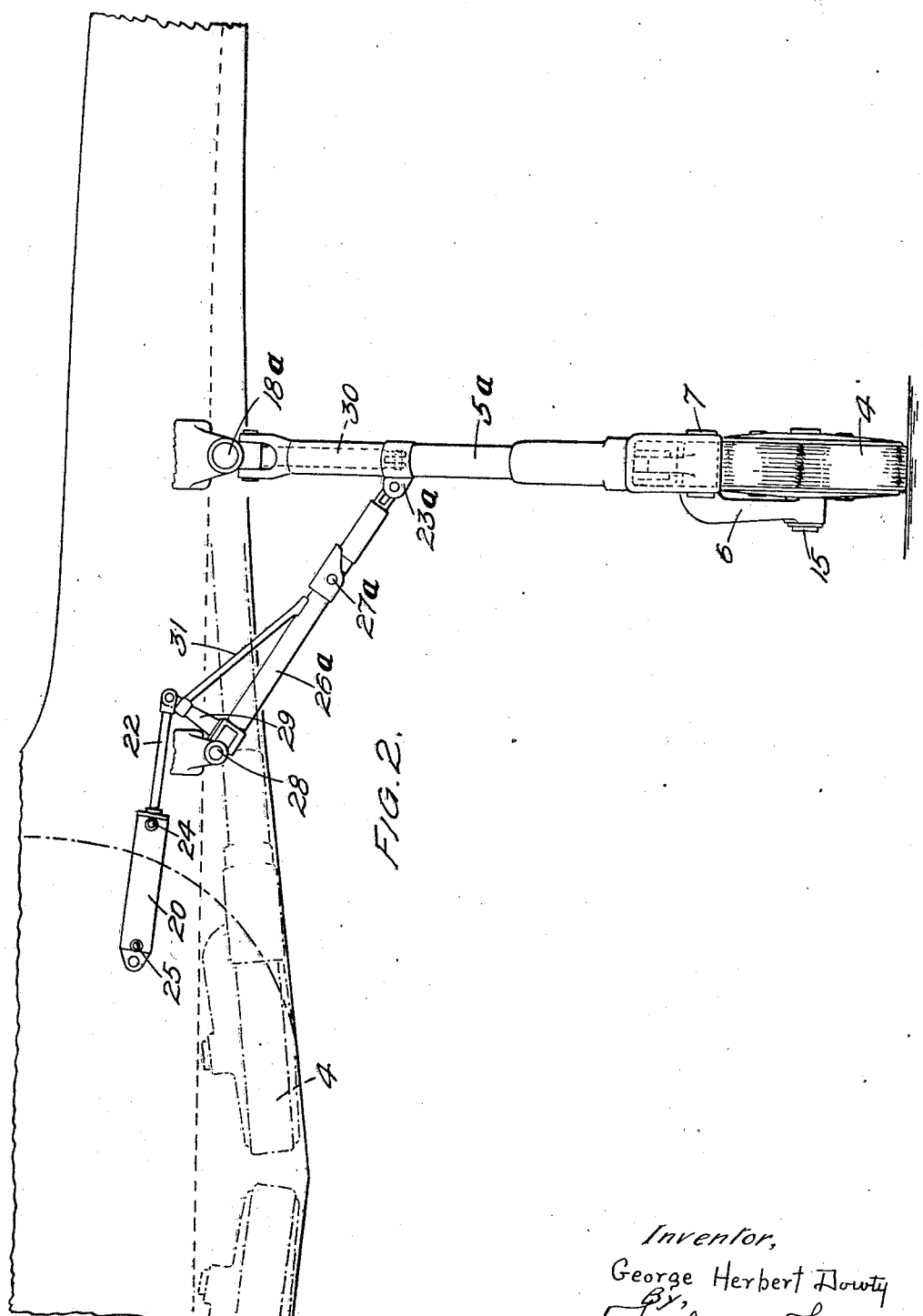

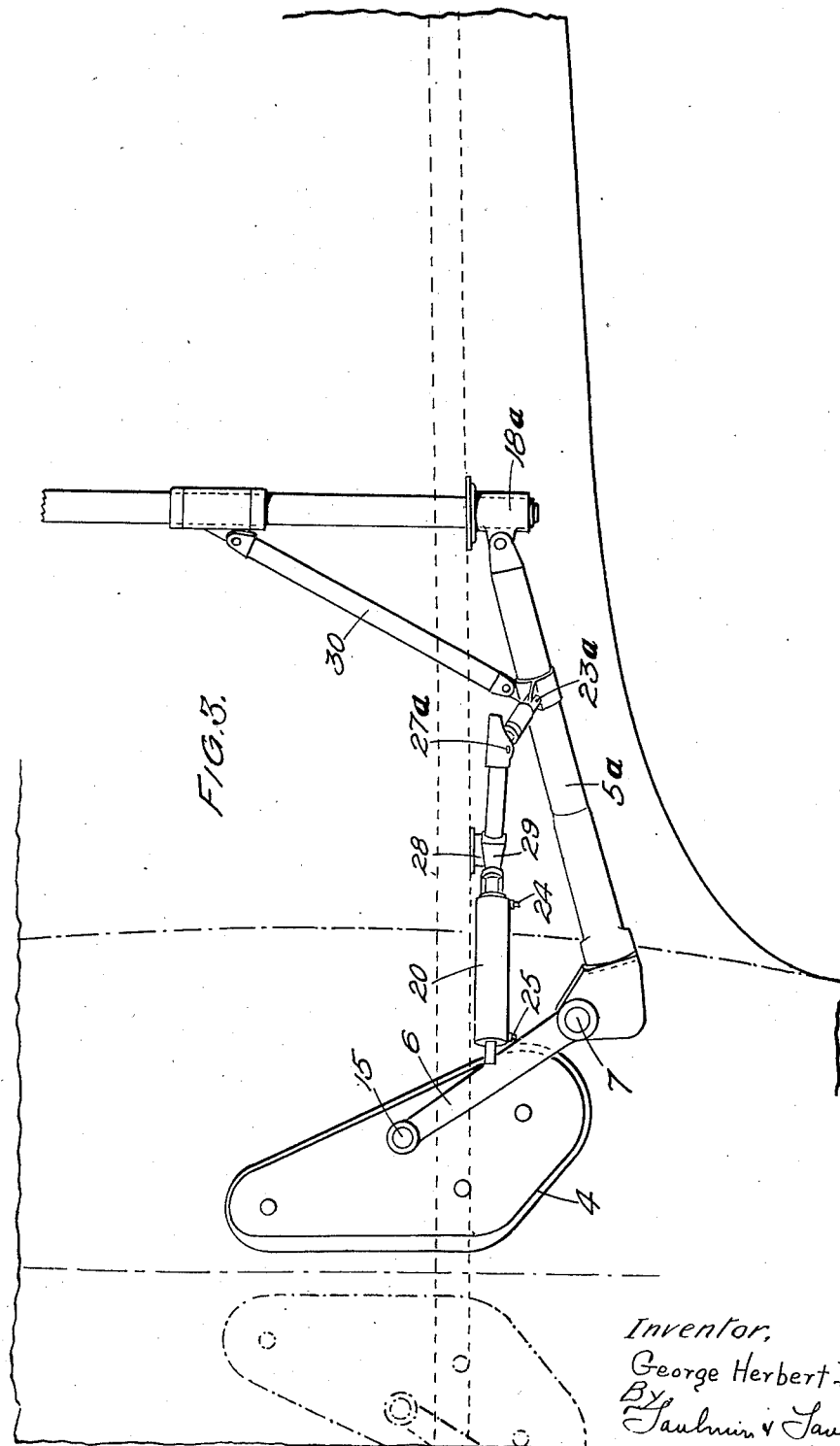

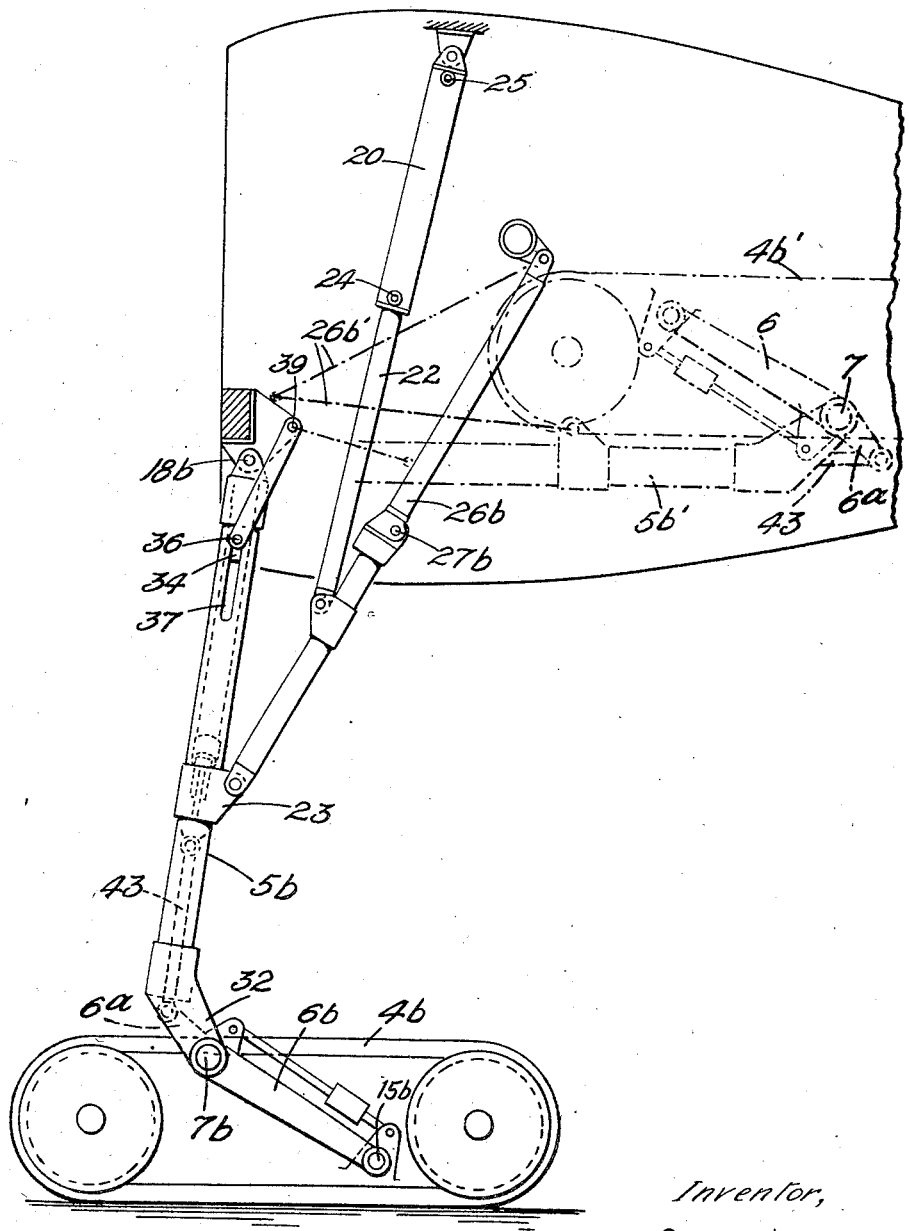

Patented Aug. 3, 1943

2,326,020

UNITED STATES PATENT OFFICE 2,326,020

AIRCRAFT LANDING GEAR

George Herbert Dowty, Cheltenham, England

Application November 25, 1939, Serial No. 306,20⸳
In Great Britain December 8, 1938

13 Claims. (Cl. 244—102)

My invention consists in the provision in a satisfactory form of retractable aircraft landing gear employing endless track landing means.

Although there have been numerous prior proposals for employing endless track treads as landing elements, such arrangements have not previously been usefully adopted in any general sense. Among the previous proposals there have been large endless track units; relatively small units generally taking the form of auxiliary wheels provided fore and aft of a main landing wheel and having an endless band passed around the collective wheel assembly; while, finally, there have been proposals embodying again a large assembly in the form of a bogie around each lateral set of wheels of which an endless band was optionally provided.

The very nature of the previous proposals leads me to believe that they were mainly intended as expedients to operate in unfavourable circumstances rather than serious attempts to provide satisfactory landing gear embodying endless track for general use.

In any event the previously-proposed arrangements are ill-adapted and therefore unsatisfactory for use with modern aircraft in which aerodynamic drag is to be avoided. It therefore becomes practicable to employ endless track now only when satisfactory retraction can be devised.

In essence my invention may be said to result from an appreciation that satisfactory endless track landing elements need have an overall length not appreciably larger and in general less than the diameter of a wheel which might ordinarily be expected to be employed, while it would moreover ordinarily be considerably less in overall height.

Thus, the primary object of my invention is to provide for retraction of an undercarriage including endless track landing element in a satisfactory manner.

A further object of my invention is to reduce the space occupied by landing elements when retracted, thereby affording more available accommodation in the aircraft or more space for fuel et cetera in wings.

Yet another object is to obviate the necessity at least in part for doors or specially constructed cover plates forming closures to the space into which a landing element is retractable; to this end the invention provides that a surface of endless track landing element is effective partly or wholly as a closure.

The invention includes the provision of convenient methods of retraction of landing gear having endless track landing elements in which the landing element is orientated in retraction whereby it assumes a favourable stowed position. By the term "orientated" in this connection I mean turning of the element in space in addition to any such turning as may result from the actual movement of the element in retraction.

In the accompanying drawings forming a part of this specification and in which like numerals are employed to designate like parts throughout the same:

Figure 1 shows an arrangement of undercarriage and endless track landing element for retraction into a nacelle, the parts being shown in full lines in the extended condition and in chain lines in the retracted condition;

Figure 2 is a front elevation of an extended undercarriage leg and endless track landing element adapted for sideways retraction;

Figure 3 is a plan view showing the leg of Figure 2 in the retracted condition;

Figure 4 corresponds substantially to Figure 1 but illustrates a modified form of my invention;

Figure 5 is an enlarged fragmentary detail view of the leg part of Figure 4.

Figure 6 is a cross-sectional view taken along line 6—6 of Figure 5.

The mounting of the endless track landing element, generally indicated by the reference numeral 4, is similar to that described in my co-pending application Serial No. 306,205, in which the endless track landing element is connected to the leg 5 by means of the lever 6 turning about the pivot 7 on the end of the leg. A fitting 8 is formed as one with the leg the end of which is hollow for the reception of suitable telescopic shock-absorbing means, and within the portion 8 there is a short lever extension of the lever 6 connected to the shock-absorber provided within the hollow end of the leg. It will be appreciated that by reason of the fact that the lever portion 6 is very much longer than the oppositely-extending short portion (not shown in the present case but clearly dealt with in the aforesaid co-pending application) relatively large movements of the endless track unit for shock-absorption purposes are able to take place with only relatively small yield of the shock-absorber. In addition to the connection between the endless track landing element and the leg assembly afforded by the lever 6, there is a yieldable link including a resilient member 9, a fluid-operated jack element 10 and a connecting rod 11. A plunger moving within the jack has its rod 12 connected to a lug 13 on the end of the leg, whereas the resilient member 9 is connected to a lug 14 on the endless track landing element. The form of the yieldable link and its function is adequately described in my aforesaid co-pending application and need not be dealt with here in any further detail, its function being to provide for yield in pitch of the endless track landing element by rocking so as to change its attitude relative to the aircraft. The jack 10 has its main function in retraction, as will later be described, but it may also be operable for controlling the position of the endless track unit in pitch. Likewise the yieldable link and the lever 6 cooperate to form, in an extended and load-supporting condition of the undercarriage structure, a parallelogram lever system normally ensuring that movements of the endless track under load taking place in an upward and somewhat rearward direction are effected without pitching of the endless track so that the ground-contacting track 4a in movement under load is maintained substantially parallel to the landing surface, although in some cases the lever system may be deliberately designed to afford some range of movement other than the purely parallel movement which will almost invariably be sought. For operating the jack 10, which is double acting, there are the fluid lines 16 and 17.

Dealing now with the present invention, the leg 5 is mounted for swinging about the pivot 18 attached to a suitable strong point of the nacelle 19, which may be the engine nacelle. Pivoted about another conveniently disposed strong point of the nacelle is a jack body 20 which is free to swing about the pivot 21. The jack has a plunger 22 the outer end of which is pivoted to the lug 23 of the leg 5. Likewise, the jack is operated by fluid pressure appropriately applied through one or other of the connections 24, 25. On application of pressure through the connection 24 the jack is contracted, pulling up the leg 5 into the position 5' as indicated in broken lines. In performing the retraction, the jack in addition to its ordinary telescopic action also swings about the pivot 21 into the chain-line position 20'. The stowed condition of the assembly is clearly indicated in Figure 1, and it will be observed that the endless track landing element in the stowed condition as represented at 4' has had to be very considerably orientated in relation to the lever 6, the jack 10 being provided for effecting such orientation. The jack 10 in fact works in parallel or series with the main jack 20, 22, so that the yieldable link is extended during retraction, and it is thus ensured that as the leg is swung into the 5' position the endless track landing element 4 is appropriately orientated.

The Figure 1 arrangement illustrates another prominent feature of my invention, viz: the fact that the endless track landing element, and maybe at least a part of the leg itself, serves as a closure to quite a substantial part of the aperture through which retraction is performed. It will be apparent that the ground-contacting track portion as indicated by the reference numeral 4a' in the stowed condition conforms with the profile of that part of the nacelle, while it will also be observed how the surface 8a on the end of the leg also falls into agreement with the nacelle profile. For closing the stowage space completely, the usual fairings or doors may be provided in accordance with the usual practice.

Figures 2 and 3 show a convenient form of sideways retraction. In this case swinging of the leg takes place sideways about the main pivot 18a of the leg 5, the appropriate retraction effort being applied to break a strut 26 about the knuckle joint 27. The strut 26 is connected between a lug 23a on the undercarriage leg and a fixed pivot 28 mounted on the aircraft structure. For connection to the jack 20, 22, the breakable strut 26a has the relatively short lever 29; it will thus be understood that when fluid pressure is applied through the connection 24 the plunger 22 is retracted, thereby breaking the strut and drawing up the leg 5 into the position in which it is shown in Figure 3. It is apparent, particularly from Figure 3, that the leg 5 is braced by the strut 30 extending back to a fixed structure part, which as shown is concentric with the main pivot 18a. For locking the leg in the down and maybe up position, any convenient form of lock means may be provided, such locks preferably being operated by initial lost motion of the jack in known manner; for instance the release of the lock means preparatory to retraction from the fully-down position may be effected by lost motion of the jack transmitted to the lock through the rod 31.

It may be mentioned that due to the selection as to size and the particular arrangement of the endless track landing element on an undercarriage system, I am able to achieve retraction in this case without the necessity for orientating the endless track element about its pivot 15. Further, sideways retraction enables a side surface of an endless track landing element to form closure means for the stowage space.

With reference to Figures 4 and 5, it may be stated that these figures deal with a further method of retraction of an endless track landing element, in which there is employed a very desirable interconnection through which it is possible to employ the lever 6b not only in its normal function of shock-absorbing, but also to effect such orientation of the endless track unit 4b as is required to achieve satisfactory retraction. In the Figures 4 and 5 arrangement the endless track unit comprises laterally-spaced tracks, the lever 6b being located therebetween. The pivot 7b about which the lever moves in relation to the leg 5b is provided between the laterally-spaced lugs 32 extending from a boss provided on the lower end of the leg 5b. The short extension 6a which serves to connect the lever 6b with the shock-absorbing means is not visible in Figure 4, being concealed by the lug 32b, but it is clearly seen by reference to Figure 5.

It is now convenient to deal with the leg retracting means illustrated in Figure 4, in which the jack 20, 22 retracts on appropriate application of pressure to the cylinder 20 through the connection 24. The plunger 22, as it is drawn in causes the strut 26b to break about the knuckle joint 27b to produce in the retracted condition the formation shown in chain lines at 26b', the position of the leg in those conditions being indicated at 5b'.

It will be seen that in the stowed position 4b' the endless track unit has been very considerably orientated so as to lie substantially parallel with the leg 5b. The manner in which that orientation is performed will best be understood by reference to Figure 5. The leg 5b is essentially formed tubular and has an internal sleeve 33 the respective ends of which are provided with end plugs 34 and 35. The upper end plug 34 has a spigot 36 which passes right through it, projecting out laterally of the leg 5 through the slots 37 at each side thereof. The projecting portions of the spigot are connected by the short links 38 pivoted at 39. The axis of the pivot 39 is offset in relation to the leg anchorage pivot 18. The other end plug 35 has attached directly to it so as to extend inwards the plunger rod 40 of the shock-absorber element 41. The end plug 35 is appropriately secured by riveting or in some other convenient manner, and it will therefore be understood that if the sleeve 33 moves axially then the plunger rod 40 will necessarily move with it. It is apparent from the drawings that as the leg 5 swings in retraction, the projecting ends of the spigot 36 ride down the slot 37 and the spigot in moving takes with it the sleeve 33; and it follows therefore that the lower end plug together with the plunger 40 and cylinder 41 moves axially in a similar manner. Lugs 42 on the cylinder 41 of the shock-absorber are connected by the pivoted links 43 which are laterally spaced in relation to the plunger rod 40 and end plug 35 to the short lever part 6a. The manner in which the laterally-spaced links 43 clear the end plug will be seen by the explanatory cross-section Figure 6 lying alongside the lower end plug 35 in Figure 5. Immediately the cylinder 41 of the shock-absorber starts to move, motion is transmitted through the links 43, short lever 6a, pivot 7b, long lever 6b and pivot 15b to the endless track unit 4b. By reason of the fact that the lever 6a is short in relation to the lever 6b, the endless track unit 4b is orientated until eventually it assumes the position 4b' in which it is shown in Figure 4.

It is important to observe that whereas movement is transmitted to the cylinder from the sleeve 33a through the plunger rod 40 for orientating the caterpillar unit 4b, the cylinder 41 moves in relation to the plunger 40 by movement transmitted directly to it through the links 43 for shock-absorbing purposes.

Although in Figures 1, 4 and 5 I have described an arrangement in which the landing gear is retracted into a nacelle, it may be retracted into any conveniently available part of the aircraft, as shown for example in Figures 2 and 3 in which the assembly is retracted partly into the wing and partly into the belly of the fuselage.

It is to be understood that where in the present specification I have dealt with retraction, I prefer that retraction should be as complete as possible, so that the retracted element or elements leave no substantial projection such as would upset the aerodynamic profile of an aircraft. I do not however wish to exclude from the scope of my invention cases where in the retracted condition an element or part thereof still leaves a slight projection such as would permit the undercarriage to be used for alighting in emergency in a retracted condition.

Finally, I must again emphasize my intention that the present specification is to be read in conjunction with my co-pending application Serial No. 306,205, in which I have particularly described general arrangements of endless track units capable of being employed satisfactorily in aircraft landing gear. I do not propose to reiterate in the present specification the general arrangement and details which I have adequately dealt with in my aforesaid co-pending application, but I wish it to be understood that those details are generally applicable to my invention as disclosed in this specification.

What I claim is:

1. In an aircraft, landing gear including an endless track ground-contacting element, a supporting structure, lever means pivotally connected to said supporting structure and disposed in trail of said structure, means pivotally connecting said endless track element to the free end of said lever means, means for retracting and extending said endless track element and supporting structure whereby said element and said supporting structure are nested in a stowage space within the aircraft, and means for orienting said endless track element from its landing position during retraction to dispose the landing surface thereof in a position that at least a part of the surface forms a flush closure for said stowage space.

2. In an aircraft, landing gear including an endless track ground-contacting element, a supporting structure, lever means pivotally connected to said supporting structure and disposed in trail of said structure, means pivotally connecting said endless track element to the free end of said lever means, means for retracting and extending said endless track element and supporting structure whereby said element and said supporting structure are nested in a stowage space within the aircraft, and means for pivotally rotating said endless track element about its pivot on said lever from its landing position to dispose at least a part of the landing surface of said element in a position to form a closure for a stowage space within the aircraft into which said element is retracted.

3. Aircraft landing gear, including an endless track ground-contacting element, a supporting structure yieldably connecting said element to said aircraft, means for retracting and extending said element and supporting structure, and means for orienting said element from its landing position during retraction to reposition the same with respect to said supporting structure to reduce the effective area encompassed by said structure and said element, whereby the same will occupy less area when retracted into the aircraft than when extended into landing position.

4. Aircraft landing gear, including an endless track ground-contacting element, a supporting structure including a main support element yieldably connecting said element to said aircraft, means for retracting and extending said element and supporting structure, and means for orienting said element into adjacent and approximate parallelism with said main element of said supporting structure to reduce the effective area occupied by the landing gear when in retracted position.

5. In an aircraft landing gear including a supporting structure employing as ground-contacting means a caterpillar element, lever means defining a parallelogram lever system connecting said caterpillar element to said supporting structure, jack means included in an arm of said parallelogram lever system for distorting said parallelogram lever system to effect orientation of the element, means for effecting retraction and extension of the latter, said jack means being operable for effecting orientation in space of said caterpillar element in retraction and extension.

6. An aircraft landing gear comprising an endless track ground contacting element, a support strut pivotally carried upon the aircraft, a lever pivotally carried upon the support strut, means pivotally connecting said endless track element upon the free end of said lever, shock-absorbing means interposed between said lever and said strut, means connected to said strut for retracting and extending the same and said endless track, and means interconnecting said shock-absorbing means and said strut for orienting said element upon retraction and extension thereof.

7. An aircraft landing gear comprising an endless track ground contacting element, a support strut pivotally carried upon the aircraft, a lever pivotally carried upon the support strut, means pivotally connecting said endless track element upon the free end of said lever, shock-absorbing means interposed between said lever and said strut, means connected to said strut retracting and extending the same and said endless track, and means for interconnecting said shock-absorbing means and said strut for orienting said element concomitantly with retraction and extension thereof.

8. An aircraft landing gear comprising an endless track ground contacting element, a support strut pivotally carried upon the aircraft, a lever pivotally carried upon the support strut, means pivotally connecting said endless track element upon the free end of said lever, a shock absorbing system interposed between said caterpillar and said strut comprising a shock-absorbing unit in operative communication with said endless track means for rotating said endless track about said pivot, and means actuating said strut for causing retraction thereof and said endless track landing element simultaneous with actuation of, said means for rotating said endless track.

9. In an aircraft landing gear an endless track ground contacting element, a retractable strut carried by the aircraft, lever means pivotally carried upon the end of said strut opposite the mounting end thereof and in trailing relation thereto with respect the forward end of the aircraft, means pivotally mounting said endless track upon the free end of said lever, a resilient lever means connecting said endless track and said strut including a shock-absorber and means for altering the effective length of said resilient lever means to orient said endless track in retraction, and means for retracting said strut and endless track, said means for altering the length of said resilient lever means being actuated concomitantly with said retracting means.

10. In an aircraft landing gear an endless track ground contacting element, a retractable strut carried by the aircraft, lever means pivotally carried upon the end of said strut opposite the mounting end thereof and in trailing relation thereto with respect the forward end of the aircraft, said endless track being pivotally carried upon the free end of said lever, a resilient lever connection between said endless track and said strut including a shock-absorber and means for altering the effective length of said lever in trail of said strut, and means for retracting said strut and endless track, said means for altering the effective trailing length of said lever being actuated by said retracting means to rotate said endless track into adjacent and substantially parallel relation to said strut.

11. In an aircraft structure a supporting leg non-yielding under landing and taxiing loads retractably connected to the aircraft structure, lever means pivotally connected to said leg, an endless track landing element pivotally connected to said lever, retraction and extension means connected between said leg and the aircraft structure, resilient means connected between said lever and said leg to resist swinging of said lever under landing and taxiing loads transmitted thereto through said element, means to swing said lever about its pivot to orientate said element in retraction, and control means connected to said resilient means operable to effect swinging of said lever in retraction.

12. In an aircraft structure supporting means non-yielding under landing and taxiing loads retractably connected to the aircraft structure, lever means pivotally connected to said leg, an endless track landing element pivotally connected to said lever, retraction and extension means connected between said supporting means and the aircraft structure, resilient means connected between said lever and said supporting means to resist swinging of said lever under landing and taxiing loads transmitted thereto through said element, and a strut of controllably variable length connected between said landing element and said supporting means to orientate said landing element about its pivot in retraction.

13. In an aircraft structure supporting means non-yielding under landing and taxiing loads retractably connected to the aircraft structure, lever means pivotally connected to said leg, an endless track landing element pivotally connected to said lever, retraction and extension means connected between said supporting means and the aircraft structure, resilient means connected between said lever and said supporting means to resist swinging of said lever under landing and taxiing loads transmitted thereto through said element, and means to orientate said landing element in retraction, said last mentioned means comprising a resilient strut connected between said landing element and said supporting means normally operative to limit and resist pitching movement of said landing element under landing and taxiing loads and means connected to said resilient strut to override the control normally exercised thereby to orientate said landing element in retraction.

GEORGE HERBERT DOWTY.